United States Patent
Gashler et al.

(10) Patent No.: US 10,970,776 B1
(45) Date of Patent: Apr. 6, 2021

(54) VALIDATING AN ACCOUNT AVAILABLE FROM A BENEFITS PROVIDER TO MAKE PAYMENT FOR SERVICES AVAILABLE FROM ANOTHER SERVICE PROVIDER

(71) Applicant: Amazon Technologies, Inc., Seattle, WA (US)

(72) Inventors: Brad Gashler, Auburn, WA (US); Puneet Bhambri, Bellevue, WA (US); Kevin Storchan-Flis, San Diego, CA (US); Erica L. Gomez, Vashon, WA (US); Brendan Gramer, Seattle, WA (US); Chetna Jain, Brier, WA (US); Rajiv Mashruwala, Seattle, WA (US); Scott Maurer, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 197 days.

(21) Appl. No.: 16/218,897

(22) Filed: Dec. 13, 2018

(51) Int. Cl.
| | |
|---|---|
| *G06Q 30/06* | (2012.01) |
| *G06Q 10/08* | (2012.01) |
| *G06F 16/95* | (2019.01) |
| *G06Q 40/02* | (2012.01) |
| *H04L 29/06* | (2006.01) |

(52) U.S. Cl.
CPC ......... *G06Q 30/0641* (2013.01); *G06F 16/95* (2019.01); *G06Q 10/083* (2013.01); *G06Q 30/0623* (2013.01); *G06Q 30/0631* (2013.01); *G06Q 40/02* (2013.01); *H04L 63/0815* (2013.01)

(58) Field of Classification Search
CPC .. G06Q 40/08; G06Q 20/405; G06Q 30/0207; G06Q 20/145; G06Q 30/0601–0645; G06Q 30/80

USPC ..... 705/26.1, 26.2, 26.25, 26.3, 26.35, 26.4, 705/26.41, 26.42, 26.43, 26.44, 26.5, 705/26.6, 26.61, 26.62, 26.63, 26.64, 705/26.7, 26.8, 26.81, 26.82, 26.9, 27.1, 705/27.2

See application file for complete search history.

(56) References Cited

U.S. PATENT DOCUMENTS

| | | | | |
|---|---|---|---|---|
| 2005/0010446 A1* | 1/2005 | Lash | ............. | G06Q 10/10 705/2 |
| 2014/0279474 A1* | 9/2014 | Evans | ............. | G06Q 20/40 705/41 |
| 2015/0073907 A1* | 3/2015 | Purves | ............. | G06Q 20/384 705/14.58 |

OTHER PUBLICATIONS

Anonymous, "FSAstore.Com Issues Year-End Spending Tips to Help Millions of Consumers Avoid Losing Unused FSA Dollars." Financial Services Monitor Worldwide, Nov. 14, 2018.*

* cited by examiner

*Primary Examiner* — Ming Shui
(74) *Attorney, Agent, or Firm* — Kilpatrick Townsend & Stockton LLP

(57) ABSTRACT

Techniques for using an account in an electronic store are described, where the account is available from a different electronic platform. For example, a computer system receives, based on a user interface, a request for item information associated with one or more items available from a service provider. The computer system determines, based on a user account with the service provider, an association between the user account and a benefit account with a benefit provider. The computer system determines, based on the association, a deadline for a benefit that is available based on the benefit account, and determines, based on an eligibility of an item for the benefit and on the deadline, that the benefit account is usable to order the item. Further, he computer system provides, to the user interface, a description of the item and an option to use the benefit account for ordering the item.

20 Claims, 9 Drawing Sheets

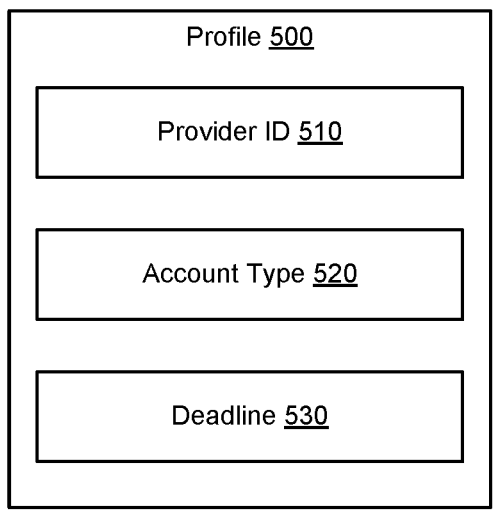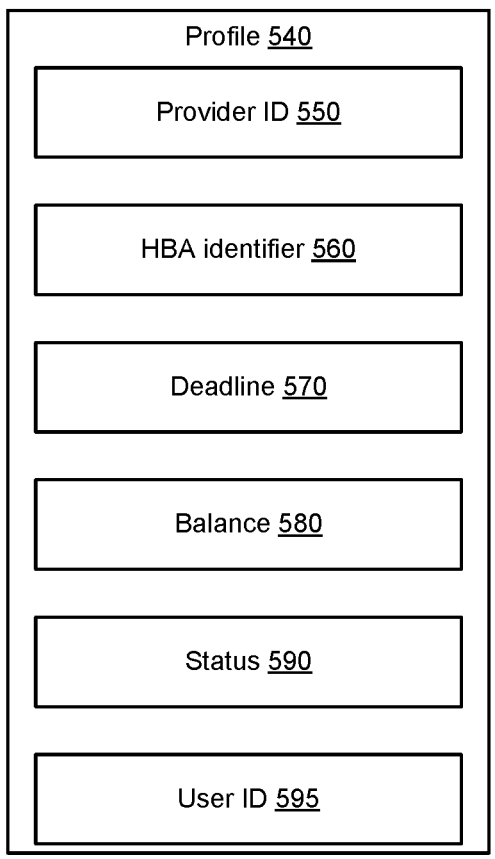
FIG. 5

US 10,970,776 B1

VALIDATING AN ACCOUNT AVAILABLE FROM A BENEFITS PROVIDER TO MAKE PAYMENT FOR SERVICES AVAILABLE FROM ANOTHER SERVICE PROVIDER

BACKGROUND

Typically, users have accounts across different electronic service providers, each providing a particular service. For example, a user may have a first account at an electronic store and may use this account to purchase items. The user may also have a second account at an electronic health provider and may use this account for making healthcare purchases under existing health insurance coverage plans (e.g., a health savings account (HSA), a health reimbursement account (HRA), a flexible spending account (FSA), and the like). Because different accounts are used, the capability of using one service to make payment for items and/or services offered via the electronic store can be limited. store

BRIEF DESCRIPTION OF THE DRAWINGS

Various embodiments in accordance with the present disclosure will be described with reference to the drawings, in which:

FIG. 5 illustrates example profiles for a benefit provider on an electronic store, according to an embodiment of the present disclosure;

DETAILED DESCRIPTION

Figure 1:
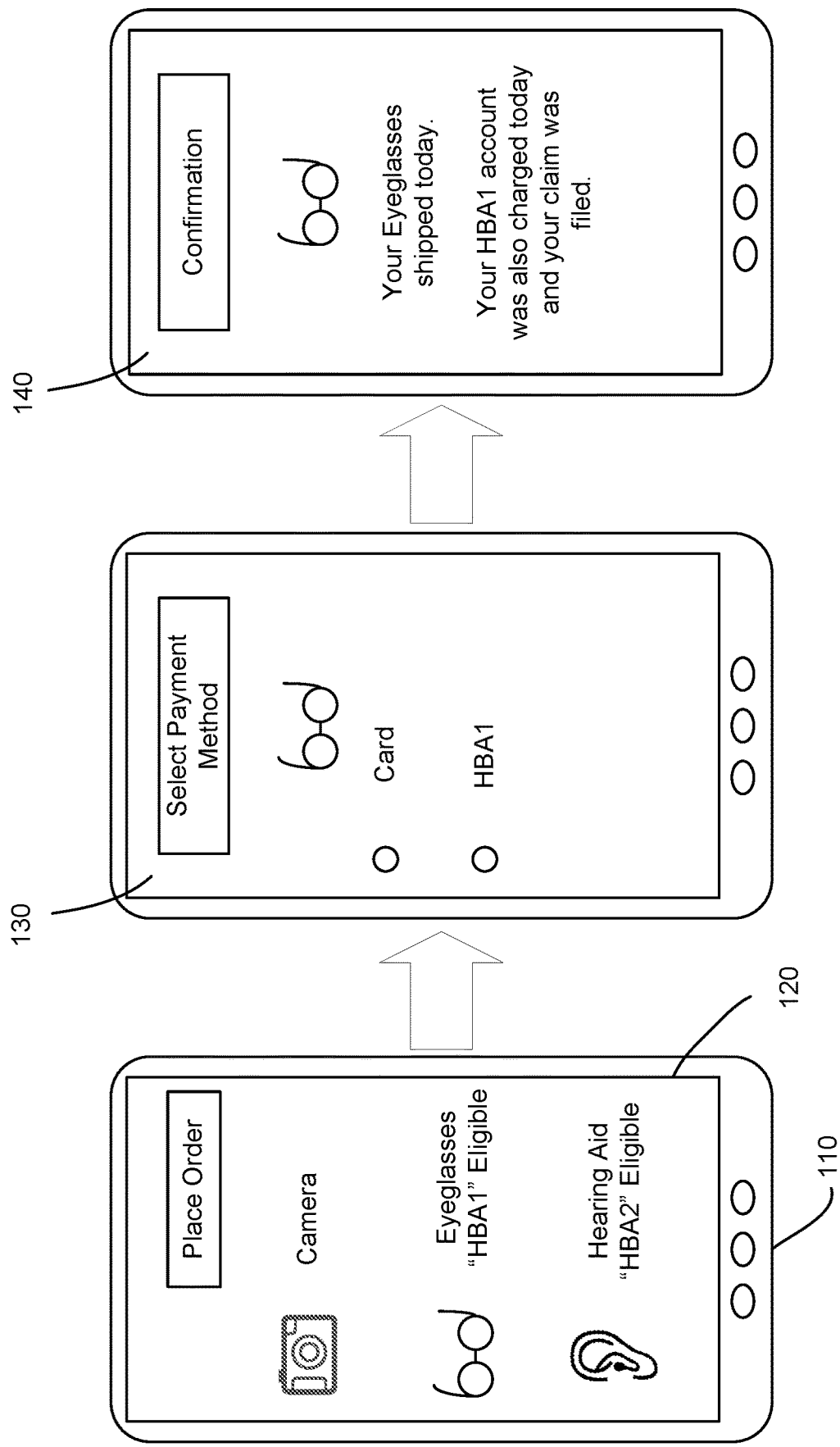
FIG. 1 illustrates an example user interface for using a benefit account on an electronic platform, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, using an account available from a benefit provider that provides a service, where this account is used on an electronic store of a service provider. The service may be subject to a deadline defined and can be received from the other electronic store depending on the deadline. In an example, a user may have a benefit account with the benefit provider that operates an electronic benefit platform, such as a health insurance platform. The benefit account may specify a benefit available to the user and subject to a deadline. The user may also have a user account with a service provider that operates an electronic store, such as one offering items. Some of the items may be indicated as being eligible for benefits available from the electronic benefit platform. The user may register the benefit account under the user account. Upon this registration, the benefit and the deadline may be associated with the user account. Upon access of the user to the electronic store, the user account may be accessed, and the association to the benefit and deadline may be determined. The electronic store may identify an item eligible for the benefit. Based on the remaining time to the deadline, the electronic store may determine whether the benefit account can be usable to order the item from the electronic store. If so, the electronic store may provide an indication to the user about the usability of the benefit account and a selectable option for the use. Upon receiving a selection of this option, the electronic store may generate a user order for the item on behalf of the user, where this request may identify the benefit account. Further, upon shipment of the item to the user, the electronic store may automatically exchange information with the electronic benefit platform to update the benefit account about the item.

To illustrate, consider an example of a health insurance platform and an electronic store. A user may have a medical flexible spending account (FSA) provided by an insurance company via the health insurance platform. The medical FSA may qualify the user to receive eyeglasses and medicine and may have a $200 remaining balance to be used by December 31 of the year. The user may also have a user account with the service provider of the electronic store for day-to-day item purchases. On December $20^{th}$ and upon using their user device to find items offered from the electronic store, a graphical user interface (GUI) presented at the user device may be updated to identify that a particular brand of eyeglasses and particular medicine are available and can be purchased with the remaining balance of their medical FSA. The user may select, via the GUI, to purchase the eyeglasses and use their medical FSA to pay for them. The electronic store may complete this transaction, ship the eyeglasses to the user, and send a related claim to the health insurance platform. On December $30^{th}$, the user may return to the electronic store and look for additional items. Although a balance remains on their medical FSA and the particular medicine are eligible, the electronic store may determine that the medicine may not ship prior to December $31^{st}$. Hence, the use of the medical FSA for these items may no longer be possible (as further described in connection with FIG. 7, a reimbursement workflow may be initiated). Accordingly, the electronic store may not provide an option to the user for selecting their medical FSA to obtain the particular medicine.

In the interest of clarity of explanation, embodiments of the present disclosure are described in connection with a health benefit account (HBA) registered with a benefit provider that operates a health insurance platform and in connection with a user account registered with a service provider that operates an electronic store. An HBA may refer to a benefit account usable to provide health-related services. A medical flexible spending account (FSA), a health savings account (HSA), and a health reimbursement accounts (HRAs) are examples of the HBA. In addition, the HBA may include money amount that a user can spend on an insurance plan, where for instance, if the user has met their deductible, the money amount may be used as a budget for items that can be redeemed from the HBA with less out of pocket costs than otherwise. However, the embodiments are not limited as such and, instead, similarly apply to other types of account and platforms. Generally, a user may have a first account registered with a first electronic platform and a second account registered with a second electronic platform. The first electronic platform may provide one or more services to the user based on the first account and the user may receive a benefit from the service(s), where the benefit can be subject to a deadline. The embodiments herein may also allow the user to receive this benefit and take advantage of the one or more services by accessing the second electronic platform and using the second user account, also subject to the deadline. To do so, the second electronic platform may associate the second account with the first account, and store information about the eligibility of receiving the benefit and about the deadline. Based on the association, eligibility, and deadline, the second electronic platform may provide an option to the user to use the first account at the second electronic platform to receive this benefit and, if this option is selected, may exchange information with the first electronic platform about the received benefit.

Embodiments of the present disclosure provide several technological advantages over existing systems. Existing systems may not allow a user to use a first account registered with a first electronic platform on a second electronic platform to benefit from a service provided by the first electronic platform. Even if allowed, the existing systems may not account for a deadline to receive the benefit. At best, such existing systems may deactivate the first account upon an expiration date of this account. In contrast, the embodiments herein may allow such a use depending on the deadline. Furthermore, this use may rely on accurate information and may be seamless to the user and secure. Accuracy may be achieved by implementing an interface between the two platforms such that exchanging up-to-date information may become possible. The security may be achieved by relying on a tokenization process for the information exchange. Seamlessness may be achieved by providing a highly responsive and intuitive user interface to the user, where this user interface may present the up-to-date information, options to select account, searches for eligibilities and deadlines.

FIG. 1 illustrates an example user interface for using a benefit account on an electronic store, according to an embodiment of the present disclosure. As illustrated a user device 110 may present a graphical user interface (GUI) 120 to a user. The GUI 120 may inform the user about items available from an electronic store of a service provider and about availabilities of health benefit account (HBAs) of the user to obtain eligible items. The GUI 120 may also provide options to the user to use such HBAs during checkout and complete an online transaction to then receive purchased items.

The user device 110 may be any type of computing device suitable for use to the user, capable of presenting the user interface, and capable of communicating with one or more computing resources of an electronic store including, for instance, web servers, to receive information and presentation instructions and present such information based on the presentation instructions. A smart speaker, a smartphone, a mobile device, a tablet, a laptop, a personal computer, and a desktop are examples of the user device 110.

The GUI 120 may be an example of a user interface. Other user interface types are possible depending on the type of the user device. For example, the user interface may be a voice-based interface presented by a smart speaker or a different computing device that provides an intelligent personal assistant service responsive to a wakeword and/or a physical tap and capable of different interactions including content playing, providing real-time information, and performing tasks and routines.

Generally, the GUI 120 (or, the user interface depending on its type) may be an interface to one or more of the computing resources of the store, including to a web server. Content presented on the GUI 120 and its presentation layout and functionalities, including information, input fields, selectable options, actionable buttons and the like may be controlled by the computing resource(s) via presentation instructions.

As illustrated, the GUI 120 may allow the user to browse or search a catalog of items offered from the electronic store. This functionality may be provided as a connection session to a web site of the electronic store, where the information is presented in web pages of the web site at the GUI 120. The electronic store may identify a user account associated with the user or the user device 110. For instance, the user may login via the GUI 120 to the electronic store by using a user account registered with the service provider. The electronic store may provide, and the GUI 120 may present, information about available items, such as descriptions (including texts, images, or other multimedia formats) of the items, prices, availabilities, delivery dates, and the like.

Some of the items may be eligible as benefits from one or more benefit providers operating electronic benefit platforms, depending on the type of HBAs. For instance, particular devices (e.g., eyeglasses, hearing aids, etc.) may be eligible based on FSAs with one or more health benefit providers, while other items (e.g., medication, vitamins, etc.) may be eligible based on health reimbursement accounts (HRAs) with the same or different benefit provider (s). Being eligible may represent the ability of purchasing the item by using a balance available from an HBA, where upon this purchase, a claim may be made to the electronic benefit platform for charging the HBA account.

Furthermore, receiving a benefit may be subject to a deadline. For instance, a benefit provider may specify that a balance available from an FSA should be used before a December 31$^{st}$ deadline.

As further illustrated in connection with FIG. 4, the electronic store may store, for an item eligible based on a benefit available from an HBA, an indication of the eligibility and a deadline for receiving the benefit. In addition, the electronic store may store an association between the user account and the HBA. The association may allow the user to use the user account to obtain the item from the service provider and receive the benefit from the benefit provider. This association may be generated based on a registration of the HBA at the electronic store and/or a registration of the user account at the electronic benefit platform.

The GUI 120 may present eligibilities of the items. Different types of presentations are possible. In one example, the GUI 120 may inform the user that an item is eligible, regardless of the deadline for receiving the benefit and/or the available balance under the applicable HBA. This presentation may be based on the fact that this item is indicated as eligible by the electronic store and that the account association indicating that the HBA is of the proper type.

In another example, the GUI 120 may inform the user that the item is eligible based also on the deadline and/or the available balance, as illustrated in FIG. 1. In the particular illustration of FIG. 1, the GUI 120 presents information about three items: a camera, eyeglasses, and a hearing aid. The camera is not indicated as being eligible for an HBA benefit. In comparison, the eyeglasses may be indicated as being eligible for a benefit under a first HBA of the user, whereas the hearing aid may be indicated as being eligible for a benefit under a second HBA of the user. This information may be displayed in one or more web pages presented by the GUI 120 including, a web page while the user is browsing for items, a web page presenting search results, a recommendation web page, and a checkout web page. The GUI 120 may also allow the user to select and add the items to a virtual cart and proceed to a checkout.

During checkout, the GUI 120 may be refreshed to present a checkout web page 130. The checkout web page 130 may identify an item added to a virtual cart and one or more available payment methods. If an HBA is usable to obtain the item, the checkout web page 130 may identify this HBA as one of the selectable payment methods. As illustrated in FIG. 1, the eyeglasses were added to the virtual cart. Accordingly, the checkout web page 130 may show the eyeglasses and identify multiple payment methods including, a credit card and the first HBA of the user. The user may then select via the GUI 120 one of the two payment methods to complete an online transaction.

Once the checkout is complete, notifications may be sent to the user device 110 to provide updates about the purchased items. In addition to informing the user about a shipment status, a notification may include an update about a charge made to a payment method. As illustrated, the GUI 120 may be updated to present a notification 140 about the eyeglasses. This notification 140 may inform the user that the eyeglasses were shipped, that their first HBA was charged upon the shipment, and that a claim was filed with the benefit provider.

Figure 2:
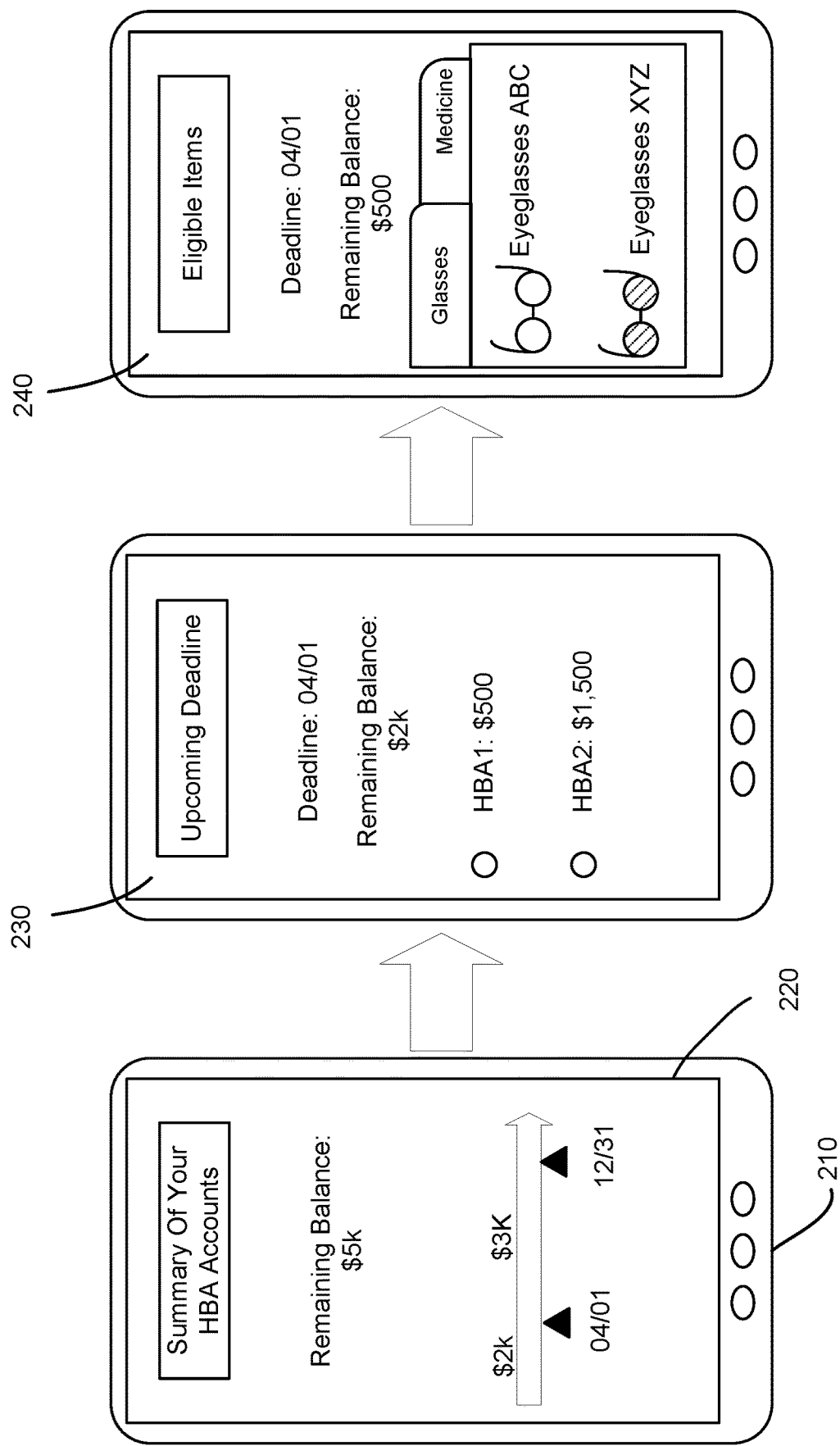
FIG. 2 illustrates an example user interface for providing an interactive summary of benefit accounts, according to an embodiment of the present disclosure.

FIG. 2 illustrates an example user interface for providing an interactive summary of benefit accounts, according to an embodiment of the present disclosure. As illustrated a user device 210 may present a graphical user interface (GUI) 220 to the user. The GUI 220 may inform the user about their benefit accounts, including balances and deadlines, and items eligible under each benefit account.

The user device 210 may be similar to the user device 110 of FIG. 1. Also similarly to the user interface of FIG. 1, the GUI 220 may be an interface to one or more computing resources of the electronic store. The electronic store may retrieve and store information about the different HBAs associated with the user account. This information may include the available balances and applicable deadlines. Because each benefit provider may use a specific format for the information, the electronic store may update the information to a format specific to the service provider such that the information stored may be normalized even when originating from different benefit providers. Because the information is normalized (e.g., has a same format for the different HBAs), the user may rely on the GUI 220 to search for the information at different granularity levels.

As illustrated, the GUI 220 may present a summary of the user's HBAs. This summary may correspond to a high granular level, where the electronic store may aggregate balances and deadlines information across the different HBAs. Under the summary, the GUI 220 may inform the user about upcoming deadlines and show balances that should be used prior to the deadlines. For instance, the GUI 220 may show an April $1^{st}$ deadline and inform the user that an aggregate balance of $2k should be used by then (and, otherwise, it would no longer be usable after that deadline). Similarly, the GUI 220 may show a December $31^{st}$ deadline and inform the user that an aggregate balance of $3k should be used by then.

Upon receiving a selection of a deadline via the GUI 220, the electronic store may update the GUI 220 to present a deadline web page 230. This update may correspond to a next granular level. In this case, the electronic store may present balances due by the selected deadline and identify the corresponding HBAs. For instance, based on the selection of the April $1^{st}$ deadline, the deadline web page 230 may show the aggregate balance of $2K, identify two HBAs, and inform the user that the balances under the first and second HBAs are $500 and $1,500, respectively. The deadline web page 230 may also provide an option to select any of the identified HBAs for a further inquiry about the selected HBA.

Upon receiving a selection of an HBA, the electronic store may update the GUI 220 to present an HBA page 240. This update may correspond to a low granular level. In this case, the electronic store may present the balance due by the deadline under the selected HBA and identify eligible item categories and items. For instance, based on the selection of the first HBA, the HBA page 240 may show the $500 balance by the April $1^{st}$ deadline. The HBA page 240 may also identify two categories of items that are eligible and that are available from the electronic store. Under each of the two categories, the HBA page 240 may identify the eligible items and may provide an option to add such items to a virtual cart for checkout. As illustrated in FIG. 1, the checkout here may also be performed under the user account and may identify the first HBA as one of the payment methods.

Figure 3:
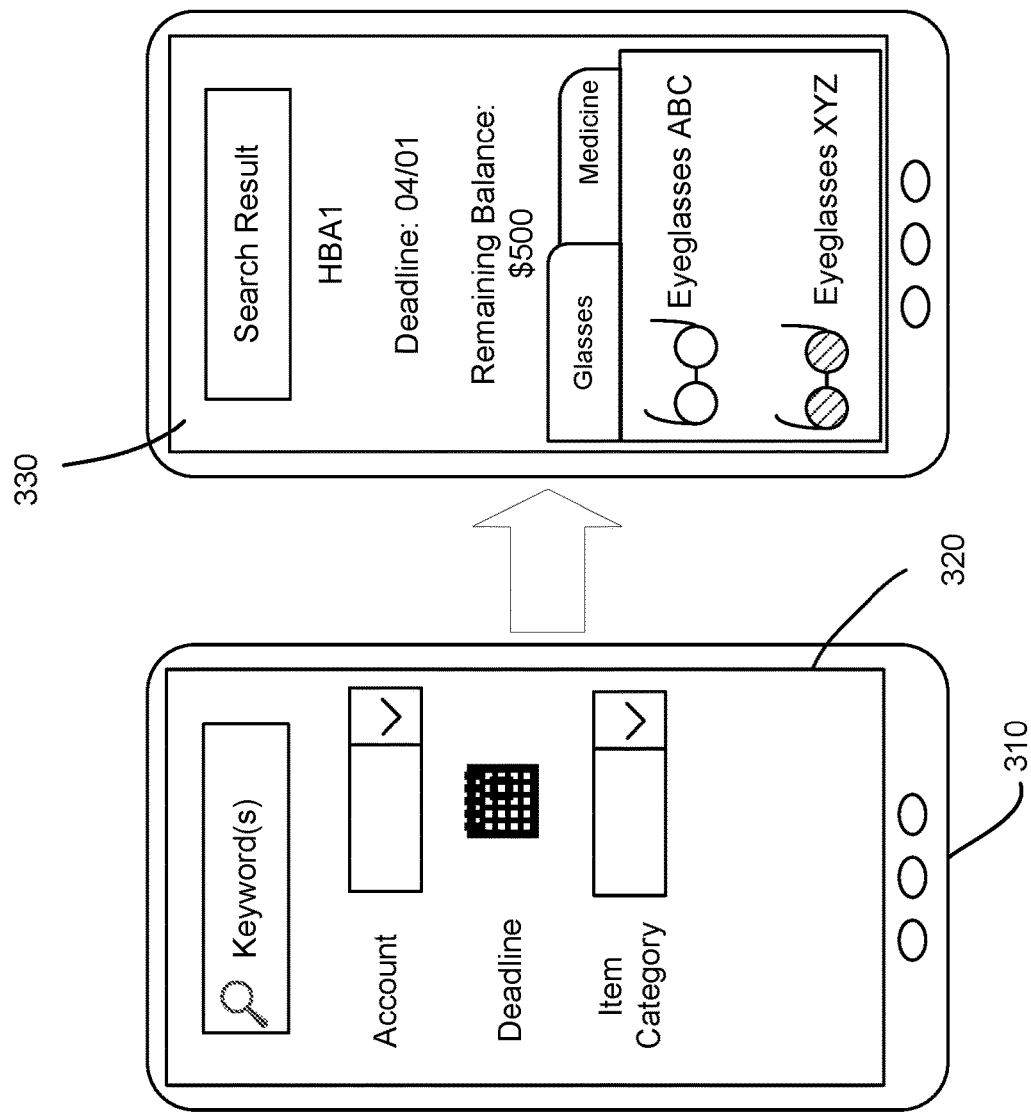
FIG. 3 illustrates an example user interface for searching for benefit information, according to an embodiment of the present disclosure.

FIG. 3 illustrates an example user interface for searching for benefit information, according to an embodiment of the present disclosure. As illustrated a user device 310 may present a graphical user interface (GUI) 320 to the user. The GUI 320 may allow the user to search for items eligible for benefits under HBAs of the user.

The user device 310 may be similar to the user device 110 of FIG. 1. Also similarly to the user interface of FIG. 1, the GUI 320 may be an interface to one or more computing resources of the electronic store. As explained herein above, the electronic store may retrieve and store information about the different HBAs associated with the user account. The electronic store may also store, for some or all items, indications of their eligibilities Generally, an item's eligibility may depend on a type of an HBA and/or a benefit provider, rather than a specific HBA of the user. The association of the user account with one or more HBAs, the balances, deadlines, and the eligibilities may be used by a search engine of the electronic store to return search results to the user. Access to the search engine may be provided via the GUI 320.

As illustrated, the GUI 320 may present different search fields. Each of these fields may be used individually for a search, or a combination of the fields may be used for a more refined search.

A first search field may be a keyword field. The keyword field may allow the user to enter text describing items of interest in a free form. Upon receiving this text, the search engine may find matching items. Different type of matching may be possible depending on the account associations, balances, deadlines, and the eligibilities. In one example, the match may rely on the eligibilities and be independent of the associations, balances, and deadlines. In this case, the search result may indicate that an item is eligible, without necessarily identifying the user's HBA, available balance, or deadline. In another example, the match may also rely on the associations, balances, and deadlines. In this case, an item is matched and presented in the search result not only if the item is eligible, but also if one of the user's HBAs provides the necessary benefit and includes the proper balance for use by a deadline that can be met.

A second search field may be an account field. The account field may provide a drop down menu to select one or more of the user's HBAs. Upon receiving a selection of an HBA, the search engine may return search results for items that are eligible under that HBA. Here also different type of matching may be possible depending on the balances, deadlines, and the eligibilities. In one example, the search result may indicate that an item is eligible based on the type of the selected HBA regardless of the balance and/or deadline. In another example, the match may also rely on balances and deadlines. In this case, an item is matched and presented in the search result not only if the item is eligible, but also if one of the selected HBAs includes the proper balance for use by a deadline that can be met.

A third search field may be a deadline field. The deadline field may provide a calendar that includes selectable dates. The selectable dates may be limited to the deadlines of the user's HBAs. Upon receiving a selection of a deadline, the search engine may return search results for items that are eligible and that can be charged in time for the deadline.

A fourth search field may be an item category field. This field may be similar to the item field, except that rather than search for an item, the user may be able to search for a category of eligible items. As illustrated, the item category field may also be set as a drop down menu, showing pre-populated and selectable categories. Upon receiving a selection of an item category, the search engine may return search results for items that belong to the selected category and that are eligible. In addition to determining that an item belongs to the selected category, here also different type of matching may be possible depending on the account associations, balances, deadlines, and the eligibilities.

As illustrated in FIG. 3, upon receiving different search criteria via the search fields of the GUI 320, the search engine may return search results. In an example, the GUI 320 is updated to present a search result page 330 that includes the search results. For instance, the search result page 330 may identify the user's first HBA, show the $500 balance by the April 1$^{st}$ deadline. The search result page 330 may also identify two categories of items that are eligible and that are available from the electronic store. Under each of the two categories, the HBA search result page 330 may identify the eligible items and may provide an option to add such items to a virtual cart for checkout. As illustrated in FIG. 1, the checkout here may also be performed under the user account and may identify the first HBA as one of the payment methods.

Figure 4:
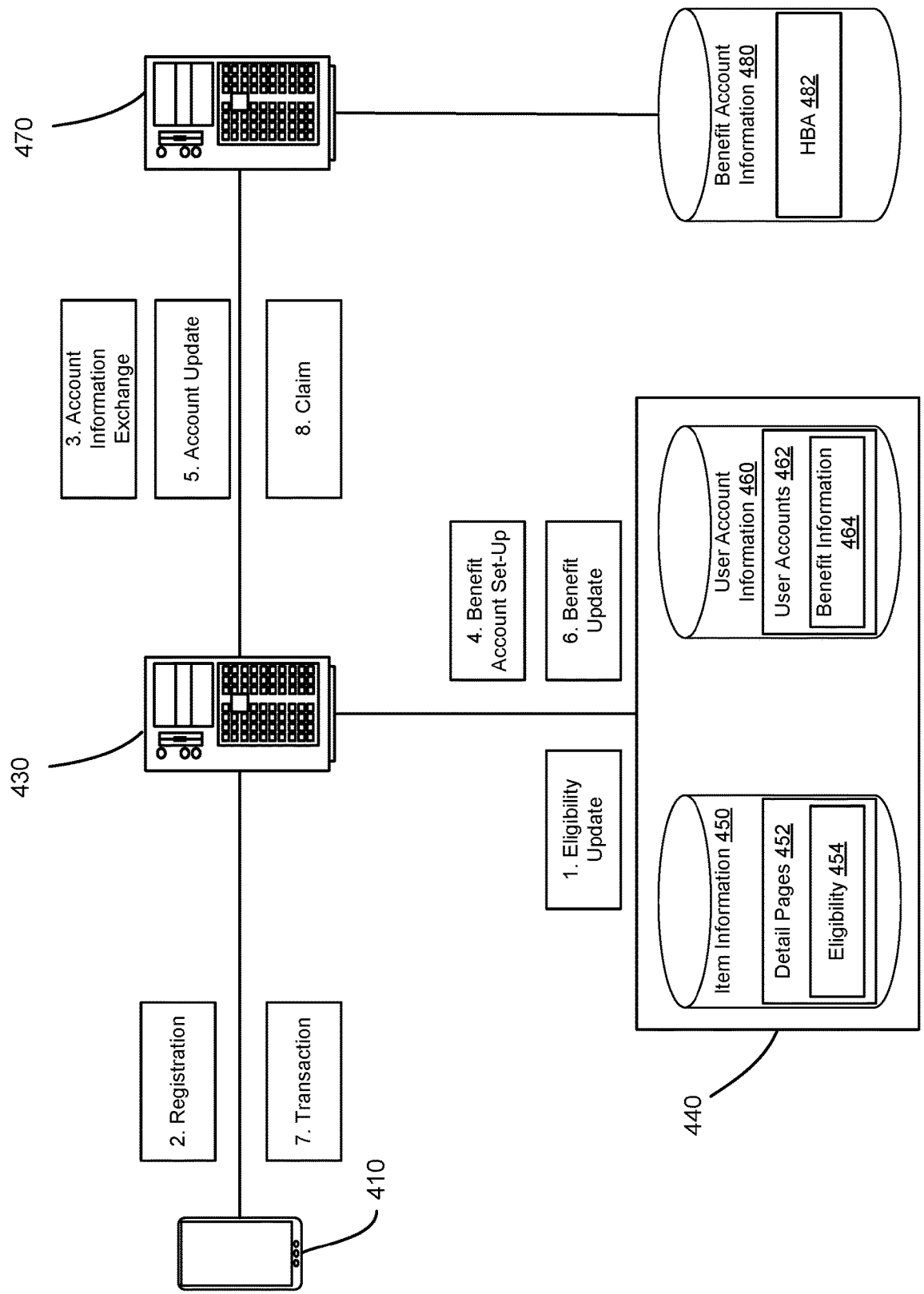
FIG. 4 illustrates an example computer network for using a benefit account on an electronic store, according to an embodiment of the present disclosure.

FIG. 4 illustrates an example computer network for using a benefit account on an electronic store, according to an embodiment of the present disclosure. The computer network may include a user device 410 of a user, and computer system 430 of a service provider, and a computer system 470 of a benefit provider, interconnected over one or more data networks. The user may have a user account with the service provider and HBAs with the benefit provider. The user device 410 may connect to one or more resources of the computer system 430, including a web server, to present information about available items offered by the service provider. This information can be presented in, for instance, web pages of a web site hosted by the web server. The computer system 430 of the service provider may also connect to one or more resources of the computer system 470 of the benefit provider to exchange benefit account information and item transaction information. Some of the functionalities provided to the user device 410, such as via the web site, may be based on the information exchange between the two computer systems 430 and 470. In particular, the web site may inform and allow the user to use their HBAs at the web site to obtain particular items offered by the service provider at the web site.

In an example, the computer system 430 of the service provider may include computing resources that provide an electronic store. In comparison, the computer system 470 of the benefit provider may include computing resources that provide an electronic benefit platform. Access to the electronic store and electronic benefit platform can be provided to the user via web sites presented in one or more GUIs at the user device 410. Data interfaces between the computer system 430 and 470 may also exist, including application programming interfaces (APIs).

The computer system 430 of the service provider may include or have access to a data store 440. The data store 440 may include multiple databases, such as an item information database 450 storing information about items offered from the electronic store, and information such as a user account information database 460 storing information about user accounts 462 usable to obtain such items.

In an example, the item information database 450 may store detail pages 452. Each detail page may correspond to an item and may include a description of the item, such as images, video, and descriptive text (including specification and price). In addition, the detail page may indicate an eligibility of an item for a benefit. For instance, the detail page may include a flag identifying whether the item is eligible or not, an identifier(s) of the benefit provider(s), and a type(s) of HBAs (e.g. FSA, HRA, etc.). In this way, the item is indicated as being eligible to a benefit offered under one or more HBA types by one or more benefit providers.

Different processes can be used to add the eligibility information of an item to its detail page. In one example, the service provider may import the eligibility information from the benefit provider, a government agency, or a third party and may run a script to update the detail page. In another example, and as further described herein below, the service provider may subscribe to push notifications from the benefit provider. Upon receiving a push notification indicating the eligibility over an API, this notification may be automatically translated into a format specific to the service provider and stored in the detail page according to this format.

The user account information database 460 may store information about the user accounts 462. For each of the user accounts 462, this information may identify a user, user preferences, available payment methods, a history of transactions, and the like. In addition, the information may include benefit information 464 for each user account. The benefit information 462 may represent an association between a user account of a user and one or more HBAs of the user with one or more benefit providers.

Different types of association are possible, as further described in the next figures. In an example, the benefit information 464 may include a unique identifier specific to an HBA of a benefit provider, such as an HBA card number or a unique token. The benefit information 464 may also include an identifier of the benefit provider and/or a type of the HBA. Further, the benefit information 464 may include deadline, balance, HBA status (e.g., active, inactive), history of online transactions conducted at the electronic store based on the HBA, a history of claims made to the benefit provider, and other information related to the HBA and/or the benefit provider.

The computer system 470 of the benefit provider may include or have access to a benefit account information database 480. This database 480 may store information about HBAs of the users. This information may uniquely identify HBA, the available benefits, deadlines, balances, and statuses, and may include a history of past claims among other information.

To allow the use of an HBA of the benefit provider at the electronic store of the service provider, multiple process steps may be followed. As illustrated in FIG. 1, these steps may include an eligibility update, a registration, an account information exchange, a benefit account set-up, an account update, a benefit update, a transaction, and a claim. These steps are further described herein next.

Under the eligibility update, the computer system 430 may update the detail pages 452 to indicate the eligibility 454 of certain items. For example, based on a data import of eligibility information or based on push notifications through API, the eligibility information may be added, edited, or removed from the detail pages.

Under the registration, the user may register their HBAs with the service provider for use at the electronic store. This registration may result in adding some of the benefit information 464 to the user account of the user in the user account information database 460. Different types of registration may be possible. In one example, the user may login to their user account via a login web page of the electronic store and may add card information of an HBA as a new payment method under their user account. This card information may be stored as the association between the user account and the HBA. In another example, a single sign-on web page may be provided to the user device 410. This web page may be available from the electronic store, in which case the user may be requested to sign on with a username and password specific to the HBA. Additionally or alternatively, the single sign-on web page may be available from the electronic benefit platform, in which case the user may be requested to sign on with a username and password specific to the user account. In both cases, upon a successful sign on, a tokenization process may be followed between the computer system 430 and the computer system 470 to exchange tokens related to the user account and/or HBA. A token may be stored under the user account as the association to the HBA.

Under the account information exchange, the tokenization process can also be performed to receive and store a token under the user account. In addition, the computer system 430 may pull benefit information about the HBA from the benefit account information 480, such as the HBA's balance, deadline(s), and status. This information pull may be performed via an API that updates and reformats the information from a format specific to the benefit provider to a format specific to the service provider.

Under the benefit account set-up, the computer system 430 may update the user account under the user account information database 460 to include the association, as defined under the registration and/or account information exchange steps, and to include the benefit information as a received account information exchange step. Once the user account has been updated, the computer system 430 may use the eligibility 454 under the detail pages 452 and the benefit information 464 under the user account to inform the user about the usability of their HBA to obtain items from the electronic store.

Under the account update, some of the benefit information of the user may change over time. For instance, the balance, deadline, status of the user's HBA, status of a claim, and/or type of benefit under the HBA can change. Such changes may be received by the computer system 430 to then update the benefit information 464 under the user account. Different ways to receive an account update may be possible. In an example, the computer system 430 may pull this information from the benefit account information database 480 through an API. Here also the API may reformat the update to the specific format of the service provider. The pull may be performed at predefined time intervals (e.g., every one week), upon approaching a deadline (e.g., upon the benefit information 464 under the user account identifying that the deadline is one week away, or some other predetermined amount of time), during access of the user to the service provider's web site, or in response to a web page request from the user device 410 for a checkout web page of the web site. In another example, the account update may be pushed from the computer system 470 to the computer system 430 via the API. In this example, the service provider may subscribe to push notifications and the API may also reformat the information to the service provider specific format.

Under the account update, the computer system 430 may update the user account under the user account information database 460 to reflect the account update. For instance, if a balance changed, the benefit information 464 is updated to show the new balance.

Under the transaction, the user may operate the user device 410 to access the electronic store and browse or search through the web site for offered items. The computer system 430 may use the eligibility 454 under the detail pages 452 and the benefit information 464 under the user account to inform the user about the usability of their HBA to obtain items from the electronic store. Web pages of the electronic store may be presented at the GUI of the user device 410. These web pages may present the information to the user and may include the option to use the HBA. If so, the computer system 430 may generate a request for an item(s) (e.g., a purchase order), where this request may identify the HBA as the payment instrument. This request may be used by a production system of the service provider to cause shipment of the item to the user.

Other types of transaction may be possible, including notifications and recommendations. For example, the computer system 430 may determine that a deadline is upcoming (e.g., is a week away, or some other predetermined amount of time) and may push a notification to the user device 410 identifying the deadline, balance, and possible items that may be obtained. In another example, while the user may be accessing the web site, the computer system 430 may provide a recommendation in a space of a web page about the deadline, balance, and possible items.

Under the claim, the user may have requested an item from the electronic store and may have identified the HBA as the payment method. Accordingly, the computer system 430 may automatically file a claim with the benefit provider on behalf of the user. In an example, the computer system 430 may generate the claim by populating its fields with the relevant information about the item, the charge date, the HBA, and/or the user. This claim may be sent via an API to the computer system 470. The API may translate the claim from a format specific to the service provider to a format specific to the benefit provider. Status updates about the claims may be received back from the computer system 470 via the API, reformatted, and stored under the user account.

FIG. 5 illustrates example profiles for a benefit provider on an electronic store, according to an embodiment of the present disclosure. A profile may generally be used to identify benefit-related information available from the benefit provider. In particular, the profile may be stored locally on a computer system of a service provider. Based on an association between a user account of a user with the service provider and an HBA of the user with the benefit provider, the computer system may access the profile from local storage to determine whether the HBA is usable for an eligible item. In this way, the processing latency for performing this determination can be significantly reduced and, in turn, the responsiveness of the user interface can be significantly improved.

As illustrated, a first profile 500 may include an identifier 510 of the benefit provider, a type 520 of the HBA (e.g. FSA, HRA, etc.), and a deadline 530 applicable to that 520 type of HBA. In other words, while this profile 500 may be specific to the benefit provider, it may be applicable to many users that have the type 520 of the HBA with the benefit provider.

To use the first profile 500, the computer system may also store, under the user account, the identifier 510 of the benefit provider and the type 520 of the user's HBA. Accordingly, upon accessing the user account, the computer system may determine the identifier 510 and type 520 and may match them with the first profile 500 among other stored profiles. Based on this match, the computer system may retrieve the deadline 530 from the first profile 500 and may use this deadline 530 as one of a number of factors to determine whether the user's HBA is usable to obtain an eligible item.

A second profile 540 may be additionally or alternatively used. Unlike the first profile 500, this profile 540 may be specific to the user. For example, the second profile 540 may include an identifier 550 of the benefit provider, an identifier 560 of the user's HBA, a deadline 570, a balance 580 of the user's HBA, and a status 590 of the user's HBA. The second profile 550 may be stored under the user account, in which case, it would represent the association between the user account and the HBA. Alternatively, the second profile 540 may be stored separately and may include, optionally, an identifier 595 of the user (or the user account). In this case, by also storing the identifier 560 of the user's HBA under the user account and/or the identifier 595 of the user under the second profile 540, either identifiers 560 or 595 can be used as the association between the user account and the HBA. Accordingly, upon accessing the user account, the computer system may determine the second profile 540 based on the association and may retrieve the deadline 570, balance 580, and/or status 580 from the second profile 540 and may use this information as factors to determine whether the user's HBA is usable to obtain an eligible item.

Figure 6:
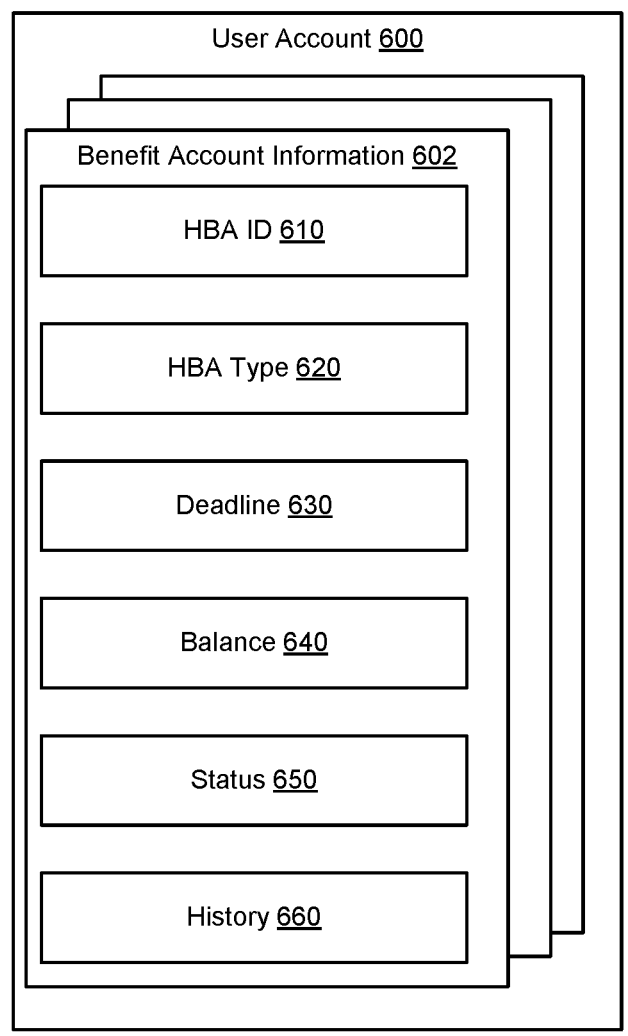
FIG. 6 illustrates an example user account on an electronic store, according to an embodiment of the present disclosure.

FIG. 6 illustrates an example user account 600 on an electronic store, according to an embodiment of the present disclosure. In an example, the user account 600 may store benefit account information usable to determine whether an HBA is usable at the electronic store. This information may be received by a computer system of the electronic store from a computer system of an electronic benefit marketplace via an API. The information may also be reformatted to a format specific to the electronic store. As explained in connection with FIG. 4, such information can be received under an account update via a pull or a push mechanism.

As illustrated, the user account 600 may store a number of benefit account information 602, each corresponding to an HBA with a benefit provider. This information 602 may represent the association between the user account 600 and the HBA. In an example, the benefit account information 602 of an HBA may include an identifier 610 of the HBA, a type 620 of the HBA, a deadline 630 for using a benefit provided under the HBA, a balance 640 of the HBA, and a status 650 of the HBA. In addition, the benefit account information 602 may store a history 660 related to the use of HBA via the electronic store. For instance, this history 660 may identify past items purchased with the HBA as a payment method, claims made, and statuses of such claims. The history 660 may also identify the date on which the HBA was created with the benefit provider (e.g., this date may be available from the service provider based on an API call). In addition, the history may identify other items purchased using different payment methods than the HBA. The purchase dates of these items may be compared to the HBA creation date. For the purchases occurring on or after the HBA creation date and utilizing other payment methods, a recommendation may be made to the user to initiate a manual reimbursement workflow or to automatically file the relevant claims from the electronic store of the service provider.

Upon accessing the user account 600, the computer system of the electronic store may identify an HBA and its type, may retrieve the applicable deadline, balance, and/or status, and may use this information as factors to determine whether the user's HBA is usable to obtain an eligible item.

Figure 7:
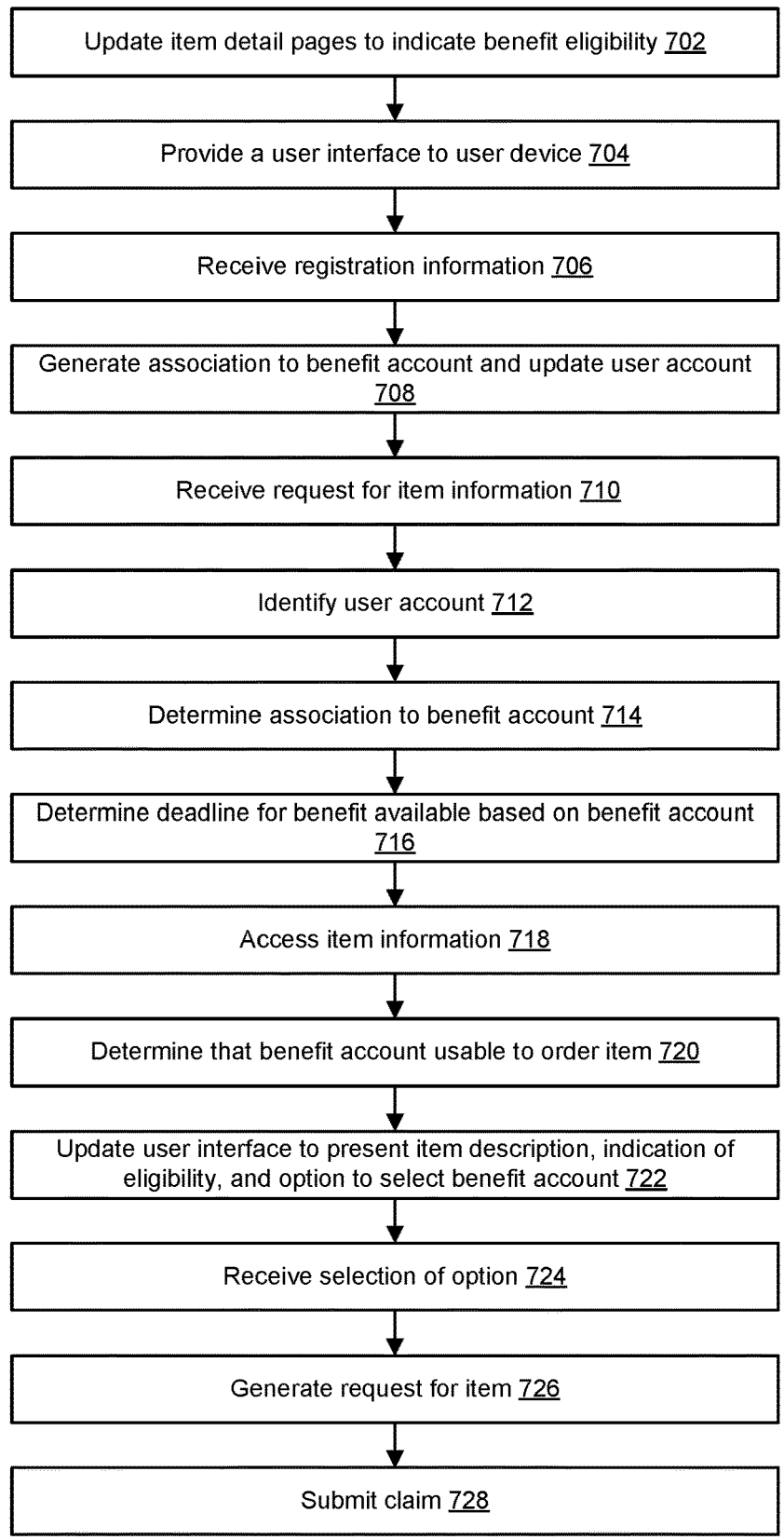
FIG. 7 illustrates an example flow for using a benefit account on an electronic store, according to an embodiment of the present disclosure.
Figure 8:
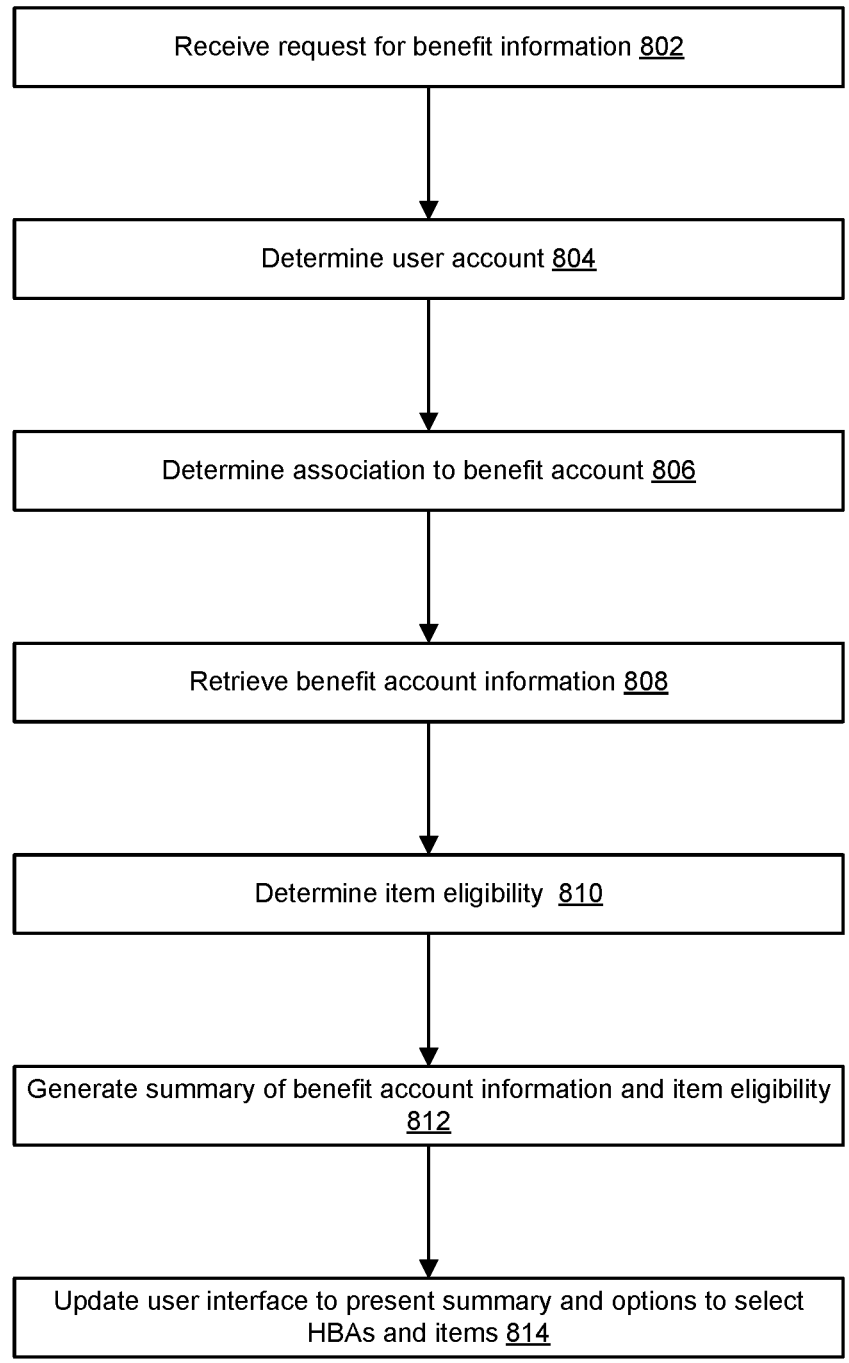
FIG. 8 illustrates an example flow for searching for benefit information, according to an embodiment of the present disclosure.

FIGS. 7-8 illustrate example flows for using a user account of a user with a service provider at an electronic store of the service provider to use a benefit from an HBA of the user with a benefit provider. A computer system of the service provider is described as performing operations of the flows. Instructions for performing the operations can be stored as computer-readable instructions on non-transitory computer-readable media of the computer system. As stored, the instructions represent programmable modules that include code or data executable by one or more processors of the computer system. The execution of such instructions configures the computer system to perform the specific operations shown in the figures and described herein. Each programmable module in combination with the respective processor represents a means for performing a respective operation(s). While the operations are illustrated in a particular order, it should be understood that no particular order is necessary and that one or more operations may be omitted, skipped, and/or reordered.

FIG. 7 illustrates an example flow for using the HBA on the electronic store, according to an embodiment of the present disclosure. The use may include obtaining an item offered on a web site of the electronic store and relying on the HBA as a payment method.

In an example, the flow may start at operation 702, where the computer system may update item detail pages to indicate benefit eligibility. In an example, eligibility information about one or more items may be imported from the benefit provider, a government agency, or a third party. The eligibility information about an item may identify whether the item may be eligible for a benefit offered under one or more particular types of an HBA by one or more benefit providers. Upon the import, the computer system may run a script to update the detail pages. In another example, the eligibility information may be received over one or more APIs.

At operation 704, the computer system may provide a user interface to a user device. In an example, the user interface may be to one or more computing resources of the electronic store including, for instance, a web server. The user interface may include a GUI presented on the user device. The GUI may allow the user to surf a web site of the electronic store to browse or search for items.

At operation 706, the computer system may receive registration information. In an example, the GUI may provide a registration web page, where the user may input card information and/or other information that may identify the user's HBA and, optionally, any known balances and deadlines. The computer system may store this registration information under the user account. In another example, the GUI may provider a single sign-on web page for the user to sign on to the benefit provider's platform. The sign-on information may be used for a tokenization process to register the HBA under the user account.

At operation 708, the computer system may generate an association between the user account and the benefit account based on the registration and may update the user account. In an example, the registration information and/or the token may be stored under the user account as the association. In a further example, the computer system may store a profile of the HBA's benefit provider and may update the user account to store an association to this profile, as illustrated in FIG. 5. In another example, the computer system may store the account benefit information under the user account, as illustrated in connection with FIG. 6. In addition, the user account (or the profile, as applicable) may be updated over time. For example, the computer system may pull account updates from the electronic benefit platform, or such updates may be pushed to the computer system. Upon receiving an account update, the computer system may translate this update into a format specific to the service provider for storage under the user account.

At operation 710, the computer system may receive a request for item information. In an example, the request may be received from the user device at a much later time than the user's registration and/or in a different session between the user device and the computer system. This request may include a web request identifying a web page of the web site and/or including a search for items.

At operation 712, the computer system may identify the user account, while the session between the user device and computer system is established. In an example, the user account may be identified based on a login of the user to the user account via a login web page of the web site. In another example, the user account may be determined from information available from the session, such as from a cookie stored at the user device.

At operation 714, the computer system may determine the association to the HBA. In an example, the computer system may access the user account and determine the association to the HBA. The association may be an identifier of the benefit provider and/or the type of the HBA as illustrated in FIG. 5. The association may be an identifier of the HBA itself as illustrated in FIG. 6.

At operation 716, the computer system may determine a deadline for a benefit available based on the HBA. In an example, the benefit provider's profile is accessed based on the association to identify the deadline. In another example, based on the user account containing the HBA's identifier, the computer system may also determine that the deadline under the user account is applicable. Other information relevant to the use of the HBA may be similarly identified, including a balance and a status of the HBA.

At operation 718, the computer system may access item information. In an example, the computer system may retrieve the item information from a data store storing the detail pages. The item information for an item may describe the item and include an indication of the item's eligibility for the benefit.

At operation 720, the computer system may determine that the HBA is usable to order the item. In an example, the computer system may consider a number of factors for this determination. One set of factors may include the deadline and a date on which a user order for the item would be executed. This date may be a redemption date (a date by which the user would be charged for the item), a shipment date (e.g., a date by which the item may be shipped to the user), a delivery date (e.g., a date by which the item may be delivered to the user), and/or another date related to completing a transaction on behalf of the user for the item. If the date occurs prior or by the deadline, the HBA may be usable based on this set of factors. For instance, the computer system may compare the current time to the deadline to determine the amount of time left before the benefit expires. If a transaction for the item can be completed within that amount of time, the computer system may determine that the HBA is usable. In particular, if the item could be shipped prior to the deadline, the computer system may determine that the HBA is usable and would charge the HBA at the time of shipment. In a further example, if the date occurs shortly after the deadline (e.g., a day after), the computer system may give the user the option to use a different payment method for ordering the item and may recommend a reimbursement workflow. For instance, the reimbursement workflow may include initiating a manual process by connecting the user to the relevant web page of the benefit provider or providing instructions for submitting a claim directly with the benefit provider. Another factor may include the balance. For instance, the computer system may compare the item price to the balance. If the balance is sufficient, the computer system may determine that the HBA is usable. Yet another factor may be the HBA's status. If this status indicates that the HBA is active, the computer system may determine that the HBA is usable.

At operation 722, the computer system may update the user interface to present the item description, indication of eligibility, and/or option to select the HBA. In an example, and based on the request for the item information, the computer system may refresh the GUI by updating or sending a new web page. The web page would describe an item, inform the user that the item is eligible for the benefit, and identify the user's HBA or HBA provider. In a checkout web page, the computer system may also provide the option to select the HBA as a payment method.

At operation 724, the computer system may receive a selection of the option. In an example, the user may select the option via the GUI and the computer system may receive this selection from the user device.

At operation 726, the computer system may generate a request for the item. In an example, the system may generate and send a user order (e.g., purchase order) to a production system of the electronic store. This purchase order may identify the HBA as the payment instrument. In addition, upon receiving a confirmation from the production system about the request, such as an indication that the item was shipped or delivered, the computer system may generate a claim and send this claim via an API to the electronic benefit platform. Updates about this claim may be received back from this platform and the computer system may store the updates under the user account.

At operation 726, the computer system may submit, to a computing resource of the benefit provider, a claim to the HBA to redeem the benefit for the item. In an example, the claim may identify the user, the HBA, the item, the user order, and/or an amount to be charged to the benefit account. In a further example, the claim may include other information defined by the benefit provider to fill out a claim form for the benefit. The information may be translated from a service provider format to a benefit provider format based on APIs between the computer system and the computing resource.

FIG. 8 illustrates an example flow for searching for benefit information, according to an embodiment of the present disclosure. The example flow may start at operation 802, where the computer system may receive a request for benefit information from the user device. In an example, the request may be a web request.

At operation 804, the computer system may determine the user account. In an example, the web request may identify the user account. In another example, the user account may be determined based on a login of the user and/or on session information, such as a cookie.

At operation 806, the computer system may determine an association to an HBA. For example, the user account may store such an association. If multiple HBAs are registered for the user, the computer system may determine the corresponding associations. In addition, multiple users may be associated with the same user account (e.g., a family account). Each of these users may have one or more HBAs associated with the family account. Based on benefit permissions (as set by the benefit provider, a third party, or a legal entity), the associations may be updated to indicate whether an HBA of one of the users may be used to benefit one of the other users or not.

At operation 808, the computer system may retrieve benefit account information. In an example, based on each association, the computer system may identify a benefit provider, a type of an HBA, and/or a specific HBA. The computer system may then retrieve, from a profile(s) of the benefit provider(s) and/or the user account, available deadline(s), balance(s), status(es), and/or other HBA-related information.

At operation 810, the computer system may determine item eligibility. In an example, for each of the benefit provider, HBA type, and/or HBA, the computer system may search the detail pages and identify items that may be eligible.

At operation 812, the computer system may generate a summary of the benefit account information and item eligibility. In an example, the benefit account information may be applicable to different benefit providers. Nonetheless, this information may be formatted in a format specific to the service provider. Accordingly, the computer system may apply different logic to the information including, for instance, aggregating the balances, determining the deadlines, and the like. This aggregation can be performed at different granularity levels and included in this summary. Similarly, the eligible items may be grouped in item categories.

At operation 814, the computer system may update the user interface to present the summary and options to select HBAs and items. In an example, the summary and item information may be presented in a web page via the GUI. Each of the identified HBAs, balances, and deadlines may be selectable to provide a next granular level of information. Each item may also be selectable for addition to a virtual cart.

Figure 9:
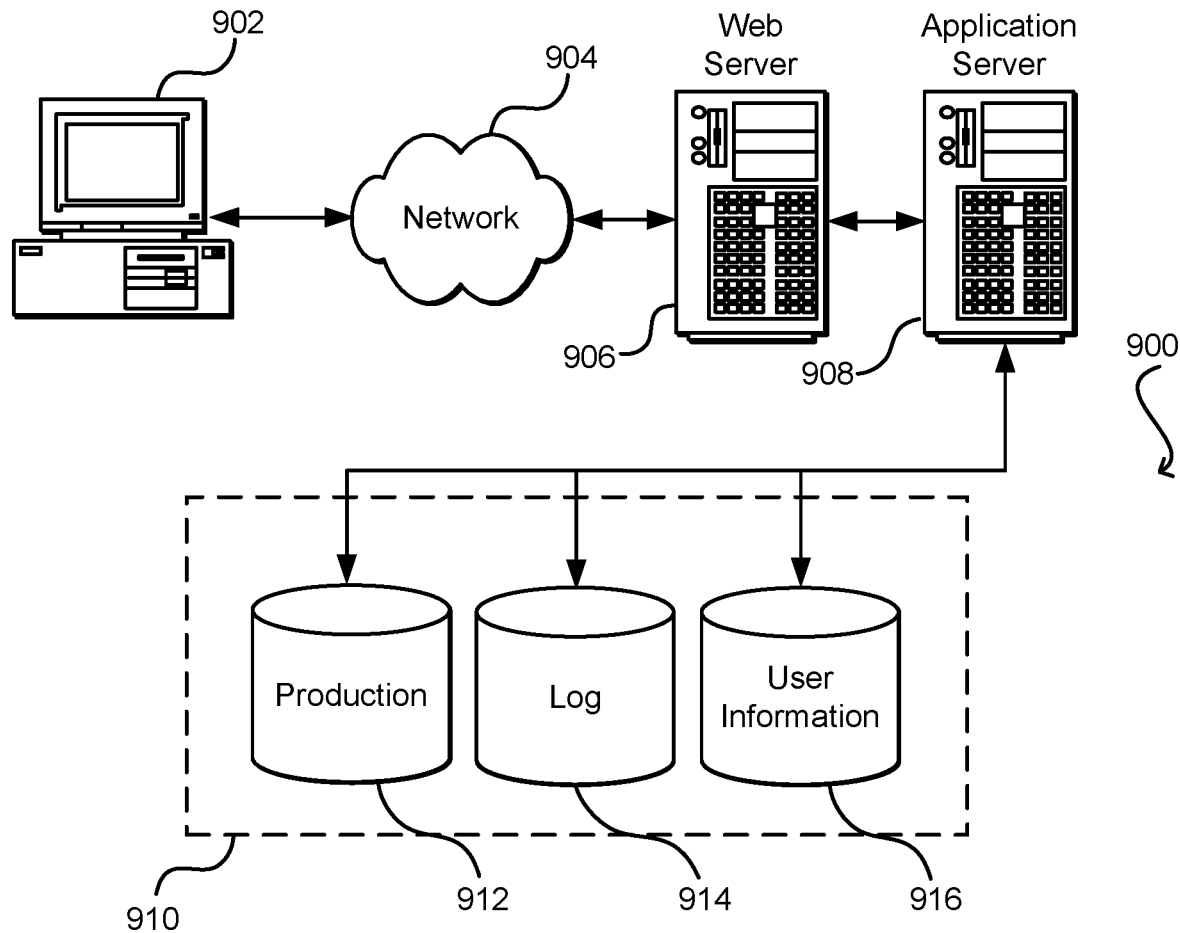
FIG. 9 illustrates a computer architecture diagram showing an example computer architecture, according to an embodiment of the present disclosure.

FIG. 9 illustrates a computer architecture diagram showing an example computer architecture, according to an embodiment of the present disclosure. This architecture may be used to implement some or all of the systems described herein. The computer architecture shown in FIG. 9 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein.

The computer 900 includes a baseboard 902, or "motherboard," which is a printed circuit board to which a multitude of components or devices may be connected by way of a system bus or other electrical communication paths. In one illustrative embodiment, one or more central processing units ("CPUs") 904 operate in conjunction with a chipset 906. The CPUs 904 may be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 may provide an interface to a random access memory ("RAM") 908, used as the main memory in the computer 900. The chipset 906 may further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM may also store other software components necessary for the operation of the computer 900 in accordance with the embodiments described herein.

The computer 900 may operate in a networked environment using logical connections to remote computing devices and computer systems through a network, such as the local area network 920. The chipset 906 may include functionality for providing network connectivity through a NIC 912, such as a gigabit Ethernet adapter. The NIC 912 is capable of connecting the computer 900 to other computing devices over the network 920. It should be appreciated that multiple NICs 912 may be present in the computer 900, connecting the computer to other types of networks and remote computer systems.

The computer 900 may be connected to a mass storage device 918 that provides non-volatile storage for the computer. The mass storage device 918 may store system programs, application programs, other program modules, and data, which have been described in greater detail herein. The mass storage device 918 may be connected to the computer 900 through a storage controller 914 connected to the chipset 906. The mass storage device 918 may consist of one or more physical storage units. The storage controller 914 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 may store data on the mass storage device 918 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 918 is characterized as primary or secondary storage, and the like.

For example, the computer 900 may store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 918 by detecting the physical states or characteristics of one or more particular locations within the physical storage units.

In addition to the mass storage device 918 described above, the computer 900 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 900.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 918 may store an operating system 930 utilized to control the operation of the computer 900. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 918 may store other system or application programs and data utilized by the computer 900. The mass storage device 918 might also store other programs and data not specifically identified herein.

In one embodiment, the mass storage device 918 or other computer-readable storage media is encoded with computer-executable instructions which, when loaded into the computer 900, transforms the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various routines described above. The computer 900 might also include computer-readable storage media for performing any of the other computer-implemented operations described herein.

The computer 900 may also include one or more input/output controllers 916 for receiving and processing input from a number of input devices, such as a keyboard, a mouse, a touchpad, a touch screen, an electronic stylus, or other type of input device. Similarly, the input/output controller 916 may provide output to a display, such as a computer monitor, a flat-panel display, a digital projector, a printer, a plotter, or other type of output device. It will be appreciated that the computer 900 may not include all of the components shown in FIG. 9, may include other components that are not explicitly shown in FIG. 9, or may utilize an architecture completely different than that shown in FIG. 9. It should also be appreciated that many computers, such as the computer 900, might be utilized in combination to embody aspects of the various technologies disclosed herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A method implemented by a computer system of a service provider, the method comprising:
   providing, to a user device of a user, a graphical user interface (GUI) to a web server of the service provider, the web server hosting a web site of the service provider;
   receiving, from the user device via a first web page of the web site presented in the GUI, a login to a health benefit account of the user with a benefit provider, the health benefit account stored at a computing resource of the benefit provider;
   receiving, from the computing resource and via an application programming interface (API) between the computer system and the computing resource, a token based at least in part on the login;
   storing, in a user account of the user with the service provider, an association between the user account and the health benefit account, the association comprising the token;
   receiving, from the computing resource and via the API, data from the health benefit account, the data received based at least in part on the token and indicating a deadline for a benefit that is available based at least in part on the health benefit account;
   receiving, based at least in part on the GUI, a web request from the user device for information about an item;
   accessing, from the web server, item information comprising a description of the item and an eligibility of the item for the benefit;
   determining, based at least in part on the eligibility of the item and on the deadline occurring after a date on which a user order for the item will be executed, that the health benefit account is usable to obtain the item from the service provider;
   updating the GUI to present a second web page based at least in part on the web request, the second web page comprising the description of the item, an indication of the eligibility of the item, and an option to use the health benefit account to order the item;
   generating, based at least in part on a selection of the option at the GUI and on the health benefit account, the user order for the item; and
   submitting, to the computing resource based at least in part on the user order and via the API, a claim to the health benefit account to redeem the benefit for the item.

2. The method of claim 1, wherein the deadline is determined from a profile of the benefit provider, and further comprising:
   generating the profile based at least in part on input of the service provider, wherein the input identifies the benefit provider, the deadline, and a type of health benefit accounts associated with the deadline, and wherein the profile comprises an identifier of the service provider, the deadline, and the type of health benefit accounts.

3. The method of claim 1, further comprising:
   retrieving, from the computing resource and based at least in part on the API, the deadline, a balance of the health benefit account, a type of the health benefit account, and a status of the health benefit account; and
   storing the deadline, the balance, and the status in the user account.

4. The method of claim 1, wherein determining the deadline comprises:
   determining a type of the health benefit account and an identifier of the benefit provider from the user account;
   accessing a profile of the benefit provider based at least in part on the identifier; and
   retrieving the deadline from the profile based at least in part on the type of the health benefit account.

5. A system of a service provider, the system comprising:
   one or more processors; and
   one or more non-transitory computer-readable storage media comprising instructions that, upon execution by the one or more processors, configure the system to:
   receive, from a user device based at least in part on a user interface presented at the user device, a login to a benefit account of a user with a benefit provider, the benefit account stored at a computing resource of the benefit provider;
   receive, from the computing resource and via an application programming interface (API) between the system and the computing resource, a token based at least in part on the login;
   store, in a user account of the user with the service provider, an association between the user account and the benefit account, the association comprising the token;
   receive, based at least in part on the user interface presented, a request for item information associated with one or more items available from the service provider;
   determine, based at least in part on the user account, the association between the user account and the benefit account;
   determine, based at least in part on an exchange of the token with the computing resource via the API, a deadline for a benefit that is available based at least in part on the benefit account;
   determine, based at least in part on an eligibility of an item for the benefit and on the deadline occurring after a date on which a user order for the item will be executed, that the benefit account is usable to order the item; and
   provide, to the user interface and based at least in part on the request for item information, a description of the item and an option to use the benefit account for ordering the item.

6. The system of claim 5, wherein the user interface comprises a graphical user interface (GUI) to a web server of the service provider, wherein the request for item information comprises a web request to the web server, wherein the user account is identified based at least in part on the login of the user, wherein providing the description and the option comprises updating the GUI to present a web page based at least in part on the web request, wherein the web page comprises the description and the option, and wherein the execution of the instructions further configure the system to generate the user order based at least in part on a selection of the option at the GUI and to submit, to the computing resource of the benefit provider based at least in part on the user order, a claim to the benefit account to redeem the benefit for the item.

7. The system of claim 5, wherein the execution of the instructions further configure the system to:
provide, to the user device based at least in part on the user interface, a web page of the service provider;
receive the token from the computing resource of the benefit provider based at least in part on a single sign-on of the user to the benefit account via the web page; and
receive the deadline from the computing resource based at least in part on communication that is between the system and the computing resource and that uses the token.

8. The system of claim 5, wherein the execution of the instructions further configure the system to:
access, based at least in part on the API, the computing resource of the benefit provider;
retrieve, from the computing resource and based at least in part on the API, account information of the benefit account, wherein the account information comprises the deadline and is received in a first format specific to the benefit provider; and
update the account information to a second format specific to the service provider.

9. The system of claim 5, wherein the deadline and a balance of the benefit account are stored in the user account, and wherein the execution of the instructions further configure the system to:
receive, based at least in part on a subscription with the benefit provider, an update to at least one of the deadline or the balance via the API to computing resource of the benefit provider; and
modify at least one of the deadline or the balance in the user account based at least in part on the update.

10. The system of claim 5, wherein the deadline and a balance of the benefit account are stored in the user account, and wherein the execution of the instructions further configure the system to:
determine that the deadline is away within a predetermined amount of time;
request, based at least in part on the API to the computing resource of the benefit provider, an update to the balance;
modify the balance in the user account based at least in part on a receipt of the update via the API; and
present a recommendation at the user interface for items eligible to the benefit based at least in part on the modified balance.

11. The system of claim 5, wherein the execution of the instructions further configure the system to:
receive a selection of the option to use the benefit account for ordering the item;
access item information specific to the item;
update the item information from a format specific to the service provider to a format specific to the benefit provider;
send the item information in the format specific to the benefit provider and an identifier of the benefit account to the computing resource of the benefit provider.

12. The system of claim 5, wherein the date is a shipment date of the item, wherein determining that the benefit account is usable to order the item comprises:
determining from item information applicable to the item that the item is indicated as being eligible for the benefit; and
determining that the shipment date occurs prior to the deadline.

13. One or more non-transitory computer-readable storage media comprising instructions that, upon execution on a system of a service provider, cause the system to perform operations comprising:
providing, to a user device of a user, a graphical user interface (GUI) to a first computing resource of the service provider;
receiving, from the user device based at least in part on the GUI, a login via the first computing resource to a benefit account of the user with a benefit provider, the benefit account stored at a second computing resource of the benefit provider;
receiving, from the second computing resource and via an application programming interface (API) between the system and the second computing resource, a token based at least in part on the login;
storing, in a user account of the user with the service provider, an association between the user account and the benefit account, the association comprising the token;
receiving, from the user device and based at least in part on the GUI, a request for item information available from the first computing resource;
determining, based at least in part on the user account, the association between the user account and the benefit account;
determining, based at least in part on an exchange of the token with the second computing resource via the API, a deadline for a benefit that is available based at least in part on the benefit account;
determining, based at least in part on an eligibility of an item for the benefit and on the deadline occurring after a date on which a user order for the item will be executed, that the benefit account is usable to order the item; and
updating, based at least in part on the request for item information, the GUI to present a description of the item and an option to use the benefit account for ordering the item.

14. The one or more non-transitory computer-readable storage media of claim 13, wherein the GUI is configured to present descriptions of items and, for an eligible subset of the items, indications of corresponding benefit accounts.

15. The one or more non-transitory computer-readable storage media of claim 13, wherein the GUI is configured to present one or more search fields associated with searching for items eligible for the benefit.

16. The one or more non-transitory computer-readable storage media of claim 15, wherein a search field constrains the searching to the deadline.

17. The one or more non-transitory computer-readable storage media of claim 15, wherein a search field constrains the searching to a particular benefit provider.

18. The one or more non-transitory computer-readable storage media of claim 13, wherein the GUI is configured to present an aggregate balance across different benefit accounts and one or more deadlines for benefits associated with the different benefit accounts.

19. The one or more non-transitory computer-readable storage media of claim 18, wherein the GUI presents each of the different benefit accounts as a selectable field, and wherein upon a selection of one of the different benefit accounts, the GUI is further configured to present a balance, the deadline, and eligible items applicable to the one of the different benefit accounts.

20. The one or more non-transitory computer-readable storage media of claim 13, wherein the operations further comprise:
- receiving account information from the user device based at least in part on the GUI, wherein the account information is specific to the benefit account; and
- storing the account information in the user account as a part of the association between the user account and the benefit account.

* * * * *